US012686279B2

(12) United States Patent
Schirmer

(10) Patent No.: US 12,686,279 B2
(45) Date of Patent: Jul. 21, 2026

(54) ELECTRIFIED MOTOR VEHICLE WITH A CENTRAL COMPONENT-SPECIFIC ENERGY MONITORING FUNCTION

(71) Applicant: Bayerische Motoren Werke Aktiengesellschaft, Munich (DE)

(72) Inventor: Pascal Schirmer, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 2 days.

(21) Appl. No.: 18/728,494

(22) PCT Filed: Feb. 17, 2023

(86) PCT No.: PCT/EP2023/053995
§ 371 (c)(1),
(2) Date: Jul. 12, 2024

(87) PCT Pub. No.: WO2023/174631
PCT Pub. Date: Sep. 21, 2023

(65) Prior Publication Data
US 2025/0121694 A1 Apr. 17, 2025

(30) Foreign Application Priority Data
Mar. 16, 2022 (DE) .................. 10 2022 106 132.9

(51) Int. Cl.
*B60L 3/12* (2006.01)
*B60L 50/60* (2019.01)
(Continued)

(52) U.S. Cl.
CPC ................ *B60L 3/12* (2013.01); *G07C 5/006* (2013.01); *G07C 5/085* (2013.01); *B60L 50/60* (2019.02); *B60L 2210/10* (2013.01)

(58) Field of Classification Search
CPC ........ B60L 3/12; B60L 50/60; B60L 2210/10; B60L 2210/12; B60L 2250/16;
(Continued)

(56) References Cited

U.S. PATENT DOCUMENTS

| | | | |
|---|---|---|---|
| 8,307,930 B2* | 11/2012 | Sailor | B60K 6/48 |
| | | | 180/65.29 |
| 8,929,098 B2* | 1/2015 | Takegami | H02M 3/33584 |
| | | | 363/16 |

(Continued)

FOREIGN PATENT DOCUMENTS

| | | |
|---|---|---|
| DE | 10 2019 114 590 A1 | 3/2020 |
| GB | 2598495 A | 3/2022 |
| WO | WO 2011/001266 A2 | 1/2011 |

OTHER PUBLICATIONS

International Search Report (PCT/ISA/210) issued in PCT Application No. PCT/EP2023/053995 dated May 22, 2023 with English translation (6 pages).

(Continued)

*Primary Examiner* — Mussa A Shaawat
(74) *Attorney, Agent, or Firm* — Crowell & Moring LLP

(57) ABSTRACT

An electrified motor vehicle with a high-voltage storage device, at least one electric machine, power electronics, a DC/DC converter, and an electronic analysis device to perform a central component-specific energy monitoring function of defined components of a low-voltage onboard electrical system and/or defined components of a high-voltage onboard electrical system. The analysis device is designed such that a specific load signature is stored for each defined component, and a complete measurement signal which is detected outside of the defined component using a first (e.g., single) measurement sensor for the entire low-voltage onboard electrical system and/or a second (e.g., single) measurement sensor for the high-voltage onboard (Continued)

electrical network is disaggregated in order to detect the load signatures using non-intrusive load monitoring (NILM) technology. Each complete measurement signal is purged of motor vehicle-specific electric disturbance variables by a defined correction device.

17 Claims, 2 Drawing Sheets

(51) Int. Cl.
  *G07C 5/00* (2006.01)
  *G07C 5/08* (2006.01)

(58) Field of Classification Search
  CPC .. B60L 2260/42; B60L 2260/46; B60L 58/20; B60L 1/00; G07C 5/006; G07C 5/085; G01R 21/133; G01R 31/006; H02J 1/082; H02J 2310/48; H02J 2310/70; Y02T 10/72
  See application file for complete search history.

(56) References Cited

U.S. PATENT DOCUMENTS

| | | | | |
|---|---|---|---|---|
| 9,007,040 | B2 * | 4/2015 | Ikeda | H02M 7/4837 |
| | | | | 323/284 |
| 10,421,371 | B2 * | 9/2019 | Faye | B60L 53/63 |
| 10,523,112 | B2 * | 12/2019 | Yan | H02M 3/33576 |
| 11,007,891 | B1 * | 5/2021 | Kamal | B60L 53/60 |
| 12,005,790 | B2 * | 6/2024 | Salter | G06Q 50/06 |
| 12,275,329 | B2 * | 4/2025 | Waag | B60L 58/19 |
| 2010/0076615 | A1 * | 3/2010 | Daniel | F03D 9/25 |
| | | | | 703/2 |
| 2011/0037317 | A1 * | 2/2011 | Kuschnarew | B60L 50/16 |
| | | | | 307/9.1 |
| 2012/0041621 | A1 * | 2/2012 | Marus | B60L 1/003 |
| | | | | 701/22 |
| 2013/0264994 | A1 * | 10/2013 | Schaefer | B60L 58/16 |
| | | | | 320/135 |
| 2013/0289788 | A1 | 10/2013 | Gupta et al. | |
| 2015/0091377 | A1 * | 4/2015 | Namou | B60L 1/00 |
| | | | | 307/10.1 |
| 2015/0231982 | A1 | 8/2015 | Li et al. | |
| 2017/0153281 | A1 * | 6/2017 | Barth | G01R 31/54 |
| 2018/0273022 | A1 * | 9/2018 | Bell | B60L 53/20 |
| 2020/0070679 | A1 | 3/2020 | Wang et al. | |
| 2020/0207219 | A1 * | 7/2020 | Slepchenkov | B60L 50/61 |
| 2021/0044233 | A1 * | 2/2021 | Glose | H02P 21/05 |
| 2022/0024332 | A1 * | 1/2022 | Powell | B60L 58/20 |
| 2022/0089058 | A1 * | 3/2022 | Vuylsteke | H01M 10/486 |
| 2022/0126712 | A1 * | 4/2022 | Mackenzie | B60L 53/11 |
| 2022/0388424 | A1 * | 12/2022 | Shirazi | B60L 58/16 |
| 2023/0010979 | A1 * | 1/2023 | Maitre | B60L 53/53 |
| 2023/0120453 | A1 * | 4/2023 | Rao | H04L 12/2825 |
| | | | | 340/4.3 |
| 2024/0131935 | A1 * | 4/2024 | Chen | G07C 5/0825 |

OTHER PUBLICATIONS

German-language Written Opinion (PCT/ISA/237) issued in PCT Application No. PCT/EP2023/053995 dated May 22, 2023 with English translation (12 pages).

German-language Search Report issued in German Application No. 10 2022 106 132.9 dated Nov. 30, 2022 with partial English translation (10 pages).

Aboulian, A. et al., "NILM Dashboard: A Power System Monitor for Electromechanical Equipment Diagnostics", IEEE Transactions on Industrial Informatics, Mar. 2019, pp. 1405-1414, vol. 15, No. 3 (10 pages).

Shaw, S. R. et al., "Nonintrusive Load Monitoring and Diagnostics in Power Systems", IEEE Transactions on Instrumentation and Measurement, Jul. 2008, pp. 1445-1454, vol. 57, No. 7 (10 pages).

Korean-language Office Action issued in Korean Application No. 10-2024-7019676 dated Dec. 17, 2025, with English translation (11 pages).

* cited by examiner

ELECTRIFIED MOTOR VEHICLE WITH A CENTRAL COMPONENT-SPECIFIC ENERGY MONITORING FUNCTION

BACKGROUND AND SUMMARY

The present disclosure relates to an electrified motor vehicle comprising central component-specific energy monitoring. By way of example, component-specific energy monitoring is in the form of what is known as non-intrusive load monitoring (NILM for short). The non-intrusive load monitoring of electrical components is a process of analyzing changes in the voltage and/or the current to derive the components used in an energy-consuming system in terms of the total system energy consumption and the individual component energy consumption. This process is used in particular in the case of electrical domestic appliances and includes the breakdown ("disaggregation") of the total energy consumption, measured at only one defined central measuring point of a system, into the individual energy consumptions of the individual components or appliances of a system.

The core concept of NILM technology is based on the assumption that every electrical component leaves behind an individual signal, a type of "load signature", in the energy distribution network. These signals are captured as aggregated total energy consumption. The individual signals (referred to below as load signature) in the total energy consumption are broken down, that is to say disaggregated, using known pattern recognition algorithms (what are known as NILM algorithms) and machine learning methods. The actual recognition of the components takes place in an event-controlled or time-controlled manner.

As a result, detailed information is obtained through the disaggregation as to the magnitude of the energy consumption of individual components and possibly the way in which this changes over time. It is therefore possible to identify energy efficiency potentials and to define appliance-specific diagnostic measures.

It is an object of the present disclosure to transfer the principle of component-specific energy monitoring of domestic appliances or other appliances in public grids to electrified motor vehicles.

This object is achieved by the features as disclosed herein. The present disclosure also relates to advantageous developments of the present disclosure.

The present disclosure relates to an electrified motor vehicle comprising a high-voltage storage device, comprising at least one electric machine, comprising power electronics, comprising a DC/DC converter, and comprising an electronic evaluation device for central component-specific energy monitoring of defined components of a low-voltage on-board electrical system and/or defined components of a high-voltage on-board electrical system. In this case, the evaluation device is configured in such a way that a specific load signature is stored therein for each defined component, and that a total measurement signal, which is captured outside of the defined components using a first (single) measurement sensor for the entire low-voltage on-board electrical system and/or using a second (single) measurement sensor for the entire high-voltage on-board electrical system, is disaggregated to identify the load signatures using NILM technology. The respective total measurement signal is furthermore cleaned of motor-vehicle-specific electrical interference variables by a defined correction device before being disaggregated.

The present disclosure is based on the following considerations:

Non-intrusive load monitoring (NILM) describes a signal decomposition method that models a plurality of signal values on the basis of an observation. Mathematically, this involves a single channel source separation problem, which is highly underdetermined and may be formulated as follows:

$$\text{Aggregation: } X_{agg} = f(x_1, x_2, \ldots, x_N) = \sum\nolimits_{n=1}^{N} x_n$$
$$\text{Disaggregation: } \{\hat{x}_1, \hat{x}_2, \ldots, \hat{x}_N\} = f^{-1}(X_{agg})$$

In the last ten years, non-intrusive load monitoring has become very important in the field of smart grids and has also been used for heavy industry (shipping, pump drives, etc.). The advantages are: cost savings due to reducing the number of required sensors and lines, measurements of variables that are not accessible using sensor systems, increases in efficiency due to accurate feedback of energy consumptions.

To date, NILM has not been proposed for vehicle systems. As a result of the advancing electrification and the development of the "living space" in vehicles, the application is increasingly of interest, however. The advantages and possibilities are as follows:

cost savings due to replacing redundant sensor systems (a central measuring point with additional calculation)

energy savings due to feedback of the energy consumptions to the customer (air-conditioning, heating, infotainment, etc.)

ascertaining inaccessible variables (brush wear of a current-controlled electric drive machine (SSM)) for predictive maintenance

PRIOR ART—SENSOR, LINE, COMPONENT

In a battery electric vehicle, the energy is distributed from a high-voltage storage device (HVS) to a high-voltage on-board electrical system (HV on-board electrical system for short) and via a DC/DC converter to a low-voltage on-board electrical system (LV on-board electrical system for short). The energy is transmitted via lines.

It is possible to measure currents and voltages on these lines using a sensor system, and there are two reasons for the measurement:

functional necessity, for example current measurement for torque control customer information, for example state of charge of the HVS On account of functional safety, redundant sensors are often used for particular functions in order to allow restricted operation in the event of a simple fault.

The redundant sensor may also be represented virtually, for example as a calculation.

Technical Problem

Measuring electrical variables, in particular for safety-relevant functions, is costly and complex (sometimes also impossible with the current version, since measuring points are inaccessible). Measured variables are needed, however, to cover two functions: firstly, functions having functional necessity, and secondly, information that is displayed to the customer relating to infotainment and that increases the driving experience.

Basic Concept of the Present Disclosure

The use of a central sensor for an HV on-board electrical system comprising defined electrical components and/or of a central sensor for an LV on-board electrical system comprising defined electrical components in an electrified motor vehicle is proposed, the respective sensor signal of which, as total energy consumption of the HV on-board electrical system and/or LV on-board electrical system, being disaggregated using a corresponding calculation method so as to obtain all the necessary individual energy consumptions of the defined components. The basic principle of NILM technology is therefore applied.

However, in the electrified motor vehicle, on account of the respective required location of the sensors, there is the technical problem of the measurement signals being distorted due to static and dynamic interference, as a result of which, in contrast to the prior art, a correction of the measurement signals is to be performed, according to the present disclosure, by correction devices before disaggregation, which eliminate this interference again as "invert filters", as it were.

By way of example, in the case of a central sensor for measuring the total energy consumption of an LV on-board electrical system, static interference results from the behavior of the DC/DC converter, which imparts a filter effect in particular due to the inductances thereof; this is because this sensor is located at the output and in the vicinity of the DC/DC converter, that is to say at the "input" of the LV on-board electrical system of an electrified motor vehicle.

By way of example, in the case of a central sensor for measuring the total energy consumption of an HV on-board electrical system, dynamic interference results from the behavior of the electric machines, in particular depending on their operating states and the switching behavior of the power electronics; this is because this sensor is located at the output of the high-voltage storage device, that is to say at the "input" of the HV on-board electrical system of an electrified motor vehicle.

The advantages of the present disclosure emerge as follows:

cost savings due to replacing redundant sensor systems (a central measuring point with additional calculation)

energy savings due to feedback of the energy consumptions to the customer (air-conditioning, heating, infotainment, etc.)

ascertaining inaccessible variables (brush wear SSM) for predictive maintenance

One exemplary embodiment of the present disclosure is shown in the drawings.

DETAILED DESCRIPTION OF THE DRAWINGS

Figure 1:
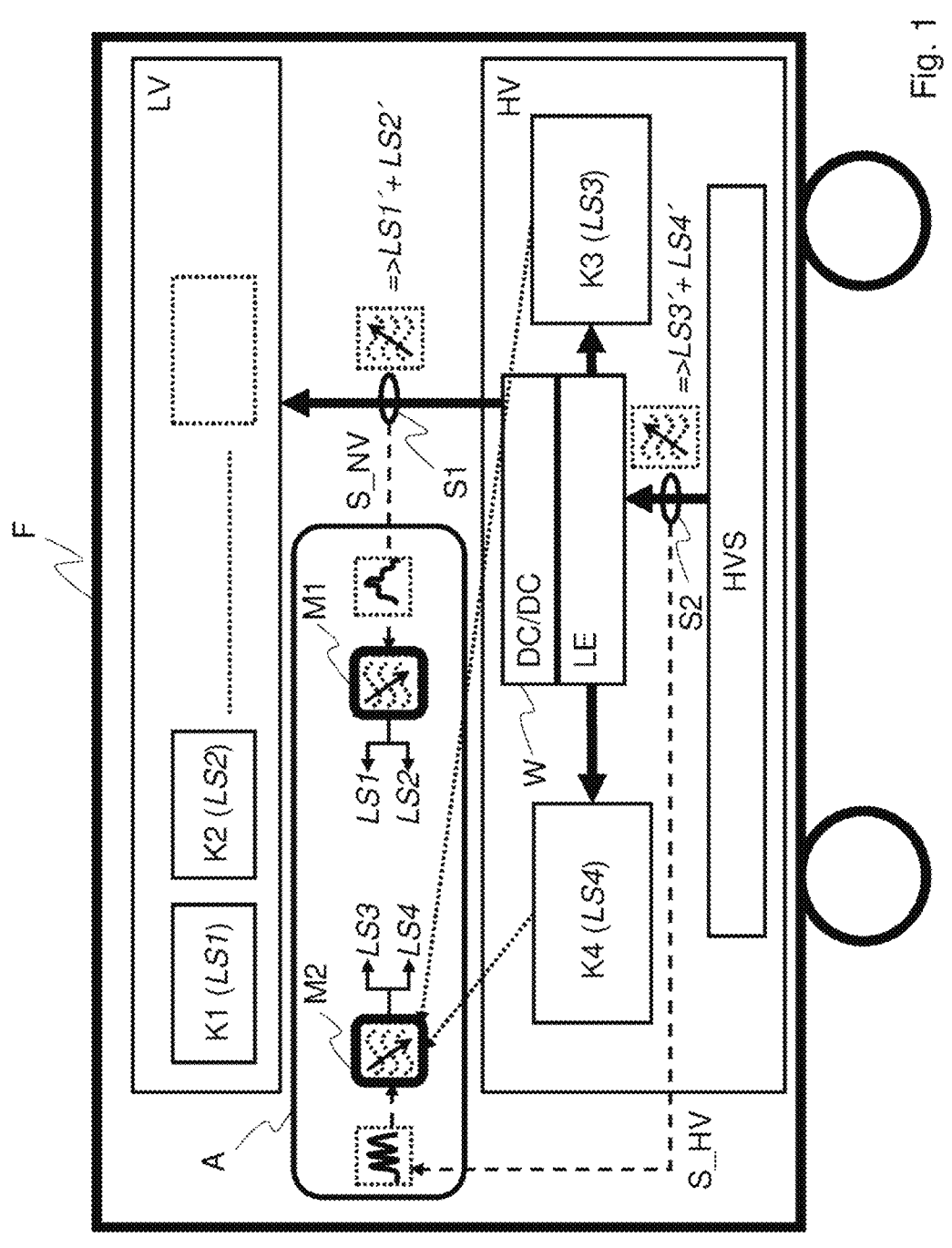
FIG. 1 shows a schematic overview of components in accordance with various embodiments of the present disclosure, in particular also a corresponding evaluation device of an electrified motor vehicle.

FIG. 1 shows an electrified motor vehicle F according to the present disclosure comprising a high-voltage storage device HVS, comprising a first electric machine K3 and comprising a second electric machine K4, comprising power electronics LE, comprising a DC/DC converter W, and comprising an electronic evaluation device A for central component-specific energy monitoring of defined components K1 and K2 of a low-voltage on-board electrical system NV and defined components K3 and K4 (in this case in the form of the electric machines) of a high-voltage on-board electrical system HV.

The evaluation device A is configured in such a way that a specific load signature LS1, LS2, LS3 and LS4 is stored therein for each defined component K1, K2, K3 and K4, and that a total measurement signal S_NV and S_HV, which is captured outside of the defined components in each case using a first measurement sensor S1 for the entire low-voltage on-board electrical system NV and using a second measurement sensor S2 for the entire high-voltage on-board electrical system HV, is disaggregated to identify the load signatures LS1, LS2, LS3 and LS4 using NILM technology. According to the present disclosure, the respective total measurement signal S_NV and S_HV is thus cleaned of motor-vehicle-specific electrical interference variables by a defined correction device M1 and M2 in each case before being disaggregated.

The first measurement sensor S1 is arranged at the output of the DC/DC converter W or at the "input" of the low-voltage on-board electrical system NV. The second measurement sensor S2 is arranged at the output of the high-voltage storage device HVS.

The correction device M1 for the total measurement signal S_NV of the first measurement sensor S1 comprises inverse behavior of the DC/DC converter W, which behavior is stored in the evaluation device A. This is because this behavior has a filtering effect for electrical interference variables on the measured load signatures LS1' and LS2' thereby distorted.

The correction device M2 for the total measurement signal S_HV of the second measurement sensor S2 comprises inverse behavior of the power electronics LE, which behavior is stored in the evaluation device A. This is because this behavior, although in a different way, also has a filtering effect for electrical interference variables on the measured load signatures LS3' and LS4' thereby distorted.

The correction device M2 is preferably settable in a variable manner, depending on current operating variables of the electric machines K3 and K4 and/or on the switching state of the power electronics LE, before the disaggregation of the total measurement signal S_HV of the second measurement sensor S2.

Figure 2:
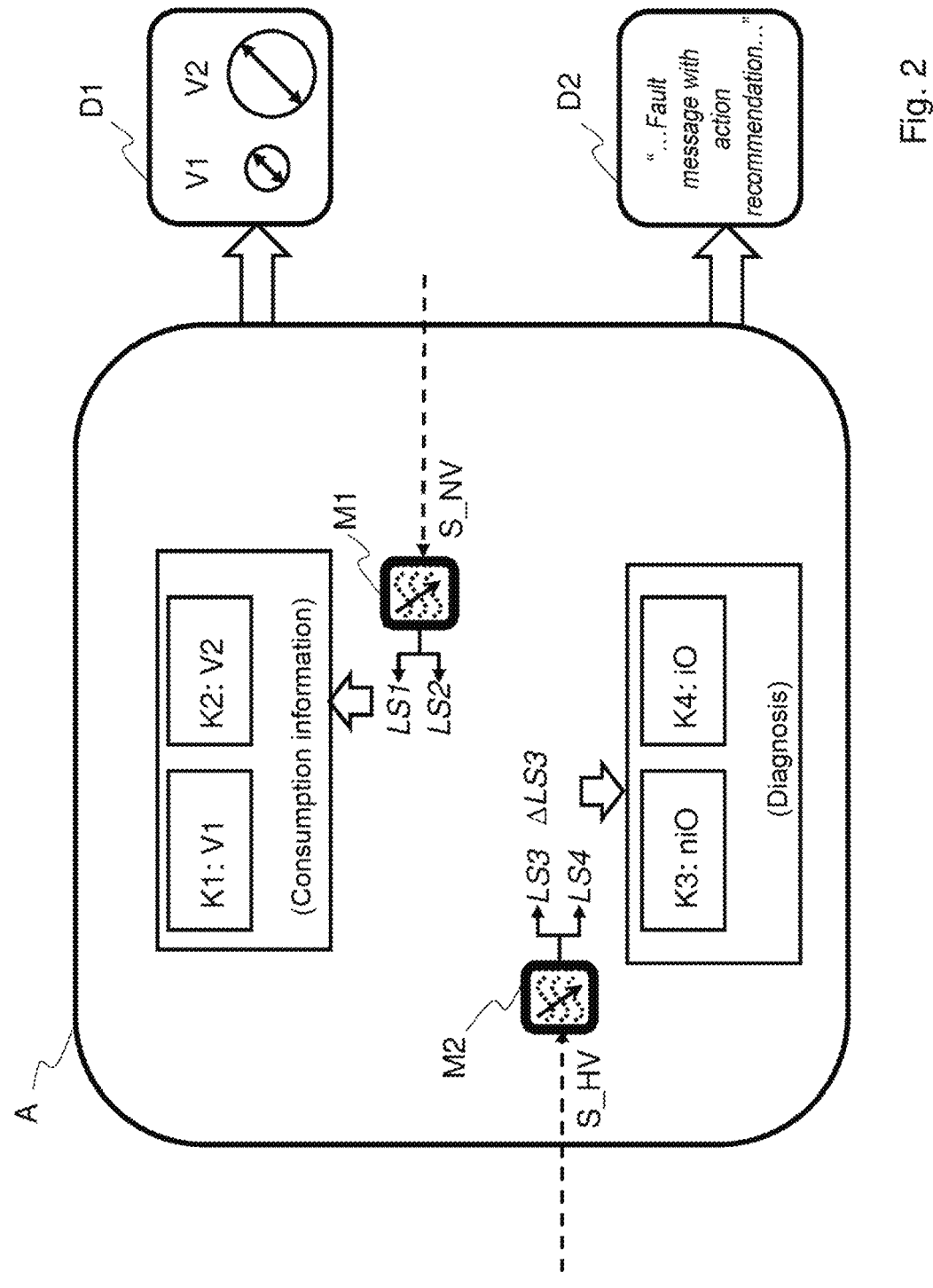
FIG. 2 shows implementation details of the evaluation device.

In one development of the present disclosure (shown in FIG. 2), the evaluation device A outputs on a first display D1 the individual energy consumption V1 and V2 of the components K1 and K2 on the basis of the disaggregated load signatures LS1 and LS2. The consumption may be displayable in circles having diameters proportional to consumption. The present disclosure is therefore used as consumption information in order to optionally display the saving potential to the driver.

Additionally or alternatively, the evaluation device A may output on a second display D2 maintenance information relating to a particular component—K3 in this case—depending on the change ΔLS3 in its individual energy consumption compared to its stored load signature LS3. The present disclosure is therefore used as a diagnosis, in this case, for example, to identify brush wear of the current-excited electric machine K3.

In summary, it is therefore the intention to provide two central sensors S1 and S2:

S1 is a current/voltage sensor at the DC/DC converter of the LV on-board electrical system.

S2 is a current/voltage sensor at the HVS of the HV on-board electrical system.

The signals of the two pairs of sensors may be used to model the corresponding LV and HV components:

$$\{p_{LV}^1, p_{LV}^2, \dots, p_{LV}^M\} = f^{-1}(I_{LV}, V_{LV})$$

$$\{p_{HV}^1, p_{HV}^2, \dots, p_{HV}^M\} = f^{-1}(I_{HV}, V_{HV})$$

In this case, $f^{-1}$ (') is any signal decomposition that is known in principle, for example machine learning, pattern matching or single channel source separation. The detailed architecture of the decomposition consists of the parts: preprocessing, framing, feature extraction, decomposition and postprocessing.

Examples of possible load signatures:

LS1 (LV): air-conditioning load signature (K1)=>for example, feedback to reduce energy consumption LS2 (LV): infotainment load signature (K2)=>for example, feedback to reduce energy consumption LS3 (HV): (current-excited) electric machine load signature K3=>to identify brush wear LS4 (HV): (current-excited) electric machine load signature K4=>to identify brush wear The load signatures may be ascertained empirically in the form of models during vehicle design.

The invention claimed is:

1. An electrified motor vehicle comprising:
a high-voltage storage device;
at least one electric machine;
power electronics comprising a DC/DC converter; and
an electronic evaluation device configured to:
    perform central component-specific energy monitoring of defined components of a low-voltage on-board electrical system and/or defined components of a high-voltage on-board electrical system, wherein the evaluation device has stored therein a specific load signature for each defined component, and
    disaggregate a total measurement signal that is captured outside of the defined components using a first measurement sensor for an entire low-voltage on-board electrical system and/or using a second measurement sensor for an entire high-voltage on-board electrical system, to identify the load signatures using non-intrusive load monitoring (NILM) technology,
    wherein the respective total measurement signal is cleaned of motor-vehicle-specific electrical interference variables by a defined correction device before being disaggregated.

2. The electrified motor vehicle according to claim 1, wherein the first measurement sensor is arranged at an output of the DC/DC converter and/or the second measurement sensor is arranged at an output of the high-voltage storage device.

3. The electrified motor vehicle according to claim 1, wherein the correction device for the total measurement signal of the first measurement sensor comprises inverse behavior of the DC/DC converter, which behavior is stored in the evaluation device.

4. The electrified motor vehicle according to claim 1, wherein the correction device for the total measurement signal of the second measurement sensor comprises inverse behavior of the power electronics, which behavior is stored in the evaluation device.

5. The electrified motor vehicle according to claim 1, wherein the correction device is configured to be set in a variable manner, depending on current operating variables of the at least one electric machine and/or on a switching state of the power electronics, before the disaggregation of the total measurement signal of the second measurement sensor.

6. The electrified motor vehicle according to claim 1, wherein the evaluation device outputs on a first display individual energy consumption of defined components on a basis of the disaggregated load signatures.

7. The electrified motor vehicle according to claim 6, wherein the evaluation device outputs on a second display maintenance information relating to a particular component depending on a change in its individual energy consumption compared to its stored and disaggregated load signature.

8. The electrified motor vehicle according to claim 1, wherein the evaluation device outputs on a second display maintenance information relating to a particular component depending on a change in its individual energy consumption compared to its stored and disaggregated load signature.

9. The electrified motor vehicle according to claim 2, wherein the correction device for the total measurement signal of the first measurement sensor comprises inverse behavior of the DC/DC converter, which behavior is stored in the evaluation device.

10. The electrified motor vehicle according to claim 2, wherein the correction device for the total measurement signal of the second measurement sensor comprises inverse behavior of the power electronics, which behavior is stored in the evaluation device.

11. The electrified motor vehicle according to claim 2, wherein the correction device is configured to be set in a variable manner, depending on current operating variables of the at least one electric machine and/or on a switching state of the power electronics, before the disaggregation of the total measurement signal of the second measurement sensor.

12. The electrified motor vehicle according to claim 2, wherein the evaluation device outputs on a first display individual energy consumption of defined components on a basis of the disaggregated load signatures.

13. The electrified motor vehicle according to claim 2, wherein the evaluation device outputs on a second display maintenance information relating to a particular component depending on a change in its individual energy consumption compared to its stored and disaggregated load signature.

14. The electrified motor vehicle according to claim 3, wherein the correction device for the total measurement signal of the second measurement sensor comprises inverse behavior of the power electronics, which behavior is stored in the evaluation device.

15. The electrified motor vehicle according to claim 3, wherein the correction device is configured to be set in a variable manner, depending on current operating variables of the at least one electric machine and/or on a switching state of the power electronics, before the disaggregation of the total measurement signal of the second measurement sensor.

16. The electrified motor vehicle according to claim 3, wherein the evaluation device outputs on a first display individual energy consumption of defined components on a basis of the disaggregated load signatures.

17. The electrified motor vehicle according to claim 3, wherein the evaluation device outputs on a second display maintenance information relating to a particular component depending on a change in its individual energy consumption compared to its stored and disaggregated load signature.

* * * * *